United States Patent
Tene et al.

(10) Patent No.: US 7,536,688 B2
(45) Date of Patent: *May 19, 2009

(54) SEGMENTED VIRTUAL MACHINE

(75) Inventors: Gil Tene, San Carlos, CA (US); Shyam Prasad Pillalamarri, Los Altos Hills, CA (US)

(73) Assignee: Azul Systems, Mountain View, CA (US)

( * ) Notice: Subject to any disclaimer, the term of this patent is extended or adjusted under 35 U.S.C. 154(b) by 658 days.

This patent is subject to a terminal disclaimer.

(21) Appl. No.: 10/378,061

(22) Filed: Feb. 28, 2003

(65) Prior Publication Data

US 2004/0172629 A1 Sep. 2, 2004

(51) Int. Cl.
*G06F 15/16* (2006.01)
*G06F 9/455* (2006.01)

(52) U.S. Cl. .......................................... 718/1; 709/203
(58) Field of Classification Search ...................... 718/1; 709/203
See application file for complete search history.

(56) References Cited

U.S. PATENT DOCUMENTS

| | | | | |
|---|---|---|---|---|
| 4,849,880 A * | 7/1989 | Bhaskar et al. | ............. | 717/109 |
| 5,479,643 A * | 12/1995 | Bhaskar et al. | ............. | 717/124 |
| 5,774,728 A * | 6/1998 | Breslau et al. | ............. | 717/141 |
| 6,003,065 A | 12/1999 | Yan et al. | | |
| 6,230,118 B1 * | 5/2001 | Bader et al. | .................... | 703/24 |
| 6,345,311 B1 * | 2/2002 | Breslau et al. | ............. | 719/310 |
| 6,385,643 B1 * | 5/2002 | Jacobs et al. | ................ | 709/203 |
| 6,397,242 B1 | 5/2002 | Devine et al. | | |
| 6,625,751 B1 * | 9/2003 | Starovic et al. | ............... | 714/11 |
| 6,738,977 B1 | 5/2004 | Berry et al. | | |
| 6,802,062 B1 | 10/2004 | Oyamada et al. | | |
| 6,968,539 B1 * | 11/2005 | Huang et al. | ................ | 717/115 |
| 7,036,122 B2 | 4/2006 | Bennett et al. | | |
| 7,114,157 B2 * | 9/2006 | Chaffee et al. | ............. | 718/104 |
| 7,272,799 B2 * | 9/2007 | Imada et al. | ................ | 715/767 |
| 7,313,793 B2 * | 12/2007 | Traut et al. | ..................... | 718/1 |
| 2001/0034771 A1 * | 10/2001 | Hutsch et al. | ............... | 709/217 |
| 2002/0138578 A1 * | 9/2002 | Zhou | ......................... | 709/206 |
| 2002/0184287 A1 * | 12/2002 | Nunally | ........................ | 709/1 |
| 2003/0217092 A1 * | 11/2003 | Veselov | ....................... | 709/106 |
| 2003/0229794 A1 * | 12/2003 | Sutton et al. | ................ | 713/189 |
| 2004/0073552 A1 * | 4/2004 | Bailey et al. | ................ | 707/100 |
| 2004/0148608 A1 * | 7/2004 | Gendreau et al. | .......... | 719/310 |
| 2005/0076326 A1 | 4/2005 | McMillan et al. | | |

OTHER PUBLICATIONS

Wheeler, James G., "SmartArrays and Java Frequently Asked Questions", Feb. 5, 2002, SmartArrays, Inc., pp. 1-5.*
Mayers, Chris, "Using Remote Procedure Call Standards", Mar. 24, 1996, Architecture Projects Management Limited, pp. 1-14.*
Czajkowski, Grzegorz, et al, "Automated and Portable Native Code Isolation", Sun Microsystems, SMLI TR-2001-96, Apr. 2001.

* cited by examiner

*Primary Examiner*—Van H Nguyen
*Assistant Examiner*—Kenneth Tang
(74) *Attorney, Agent, or Firm*—Van Pelt, Yi & James LLP

(57) ABSTRACT

A system and method are disclosed for a segmented virtual machine. The segmented virtual machine includes a core VM and a shell VM associated with the core VM. The core VM is configured to perform VM internal execution functionality and the shell VM is configured to perform shell VM functions and communicate with the core VM.

25 Claims, 10 Drawing Sheets

SEGMENTED VIRTUAL MACHINE

FIELD OF THE INVENTION

The present invention relates generally to virtual machines (VM's). More specifically, a segmented virtual machine is disclosed.

BACKGROUND OF THE INVENTION

An increasing number of software applications are written to platform independent execution environments such as the Java Runtime Environment and the NET Common Language Runtime. These applications generally execute within a virtual machine (VM) that provides a level of abstraction between the program execution environment and the external software interface. Applications often use middleware frameworks on top of these execution environments. Examples of such frameworks are J2EE application servers and the NET framework.

A general purpose device, such as a computer, commonly has finite resources. If each VM's execution resources is provided by the general purpose device, any such device can only support a limited number of applications and VM's. Data centers often need to support a significant number of applications. As a result, a large number of general purpose devices are deployed for resource planning purposes, with each application allotted enough resources for its peak needs, making such a setup costly to deploy and administer.

FIG. 1 is a block diagram illustrating an example system configuration for running web applications using J2EE application server frameworks. A user request is intercepted by a web server 100 and is directed to an appropriate general purpose device 102. Software components including VM 114, application server 116, and application 118 are stored on a data storage device 112 that is accessible from general purpose device 102. At initialization time, the stored software components are loaded into general purpose device 102. The rintime instantiations of the software components include VM 104, application server 106 and application 108. VM 104 launches application server 106, which in turn launches application 108. The application handles the user requests, processes the business logic associated with the requests, and communicates with database 110 if appropriate, and passes the result back to the web server.

In order to support a large number of applications, a large number of general purpose devices are deployed to accommodate the peak resource needs of the applications. It would be desirable to have a way to provide large scale application support at reduced deployment and administration costs. Also, given the existing investment in middleware frameworks and applications, an effective solution to the problem should be backward compatible with the existing applications and frameworks.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

A system and methods for an improved virtual machine (VM) is disclosed. In one embodiment, the VM segments its functionality into a shell VM and a core VM that are separate. The shell VM performs interactions with the external environment. The core VM performs VM internal execution functions including managing memory, performing computations, transferring data, processing data and processing logic. The core VM communicates through the shell VM for interaction with the external environment. Resources consumed by the core VM are separate, both logically and physically, from those consumed by the shell VM. The external environment does not need to be aware of the VM segmentation and can interact solely with the shell VM. To the external environment, the distribution of VM internal execution functions and shell functions appears transparent. The shell VM appears as a complete VM, even though it does not consume resources needed for VM internal execution.

Figure 2A:
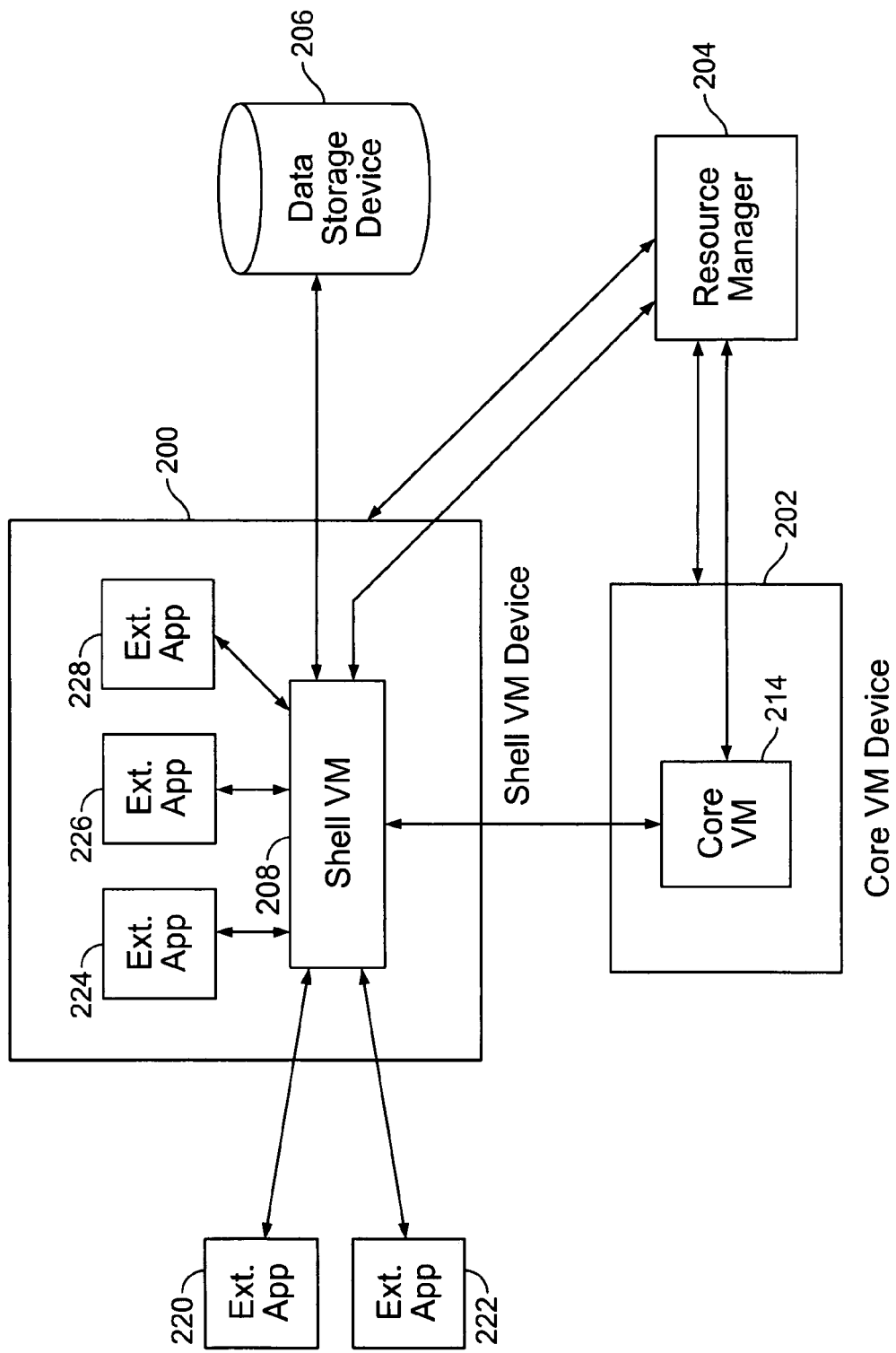
FIG. 2A is a block diagram illustrating a system embodiment according to the present invention.

FIG. 2A is a block diagram illustrating a system embodiment according to the present invention. The system includes a shell VM device 200, a core VM device 202, a resource manager 204 and a data storage device 206. The shell and core VM devices can be implemented using a wide range of hardware that is capable of executing software. Such devices include full computer systems, processors, application specific integrated circuits (ASIC's), or any other appropriate device. Shell VM 208 resides on the shell VM device and core VM 214 resides on the core VM device. Applications 220, 222, 224, 226 and 228 are referred to as external applications because their execution environment is independent of the VM. These external applications communicate with the shell VM to perform various functions. They may be located external to the Shell VM device (220 and 222), or on the Shell VM device (224, 226 and 228). These external applications interact with shell VM 208 directly, which may relay some of the interactions to core VM 214.

The shell VM may utilize one or more communications interfaces on the shell VM device to communicate with the external applications as well as with the core VM on a core VM device. In some embodiments, the shell VM also communicates with the data storage device, and optionally with the resource manager. The interfaces are separate in some embodiments and shared in others. The shell VM may also communicate with applications that reside on the shell VM device. The core VM may utilize one or more communication interfaces on the core VM device to communicate with the shell VM on a shell VM device. In some embodiments, the core VM also communicates with the data storage device, and optionally the resource manager.

Both the shell and core VM devices may communicate with the data storage device to load necessary software components. A resource manager 204 may communicate with the shell VM, the core VM, the shell VM device and the core VM device, allocating and managing system resources. The resource manager is an optional part of the system and may be omitted in some embodiments.

Figure 2B:
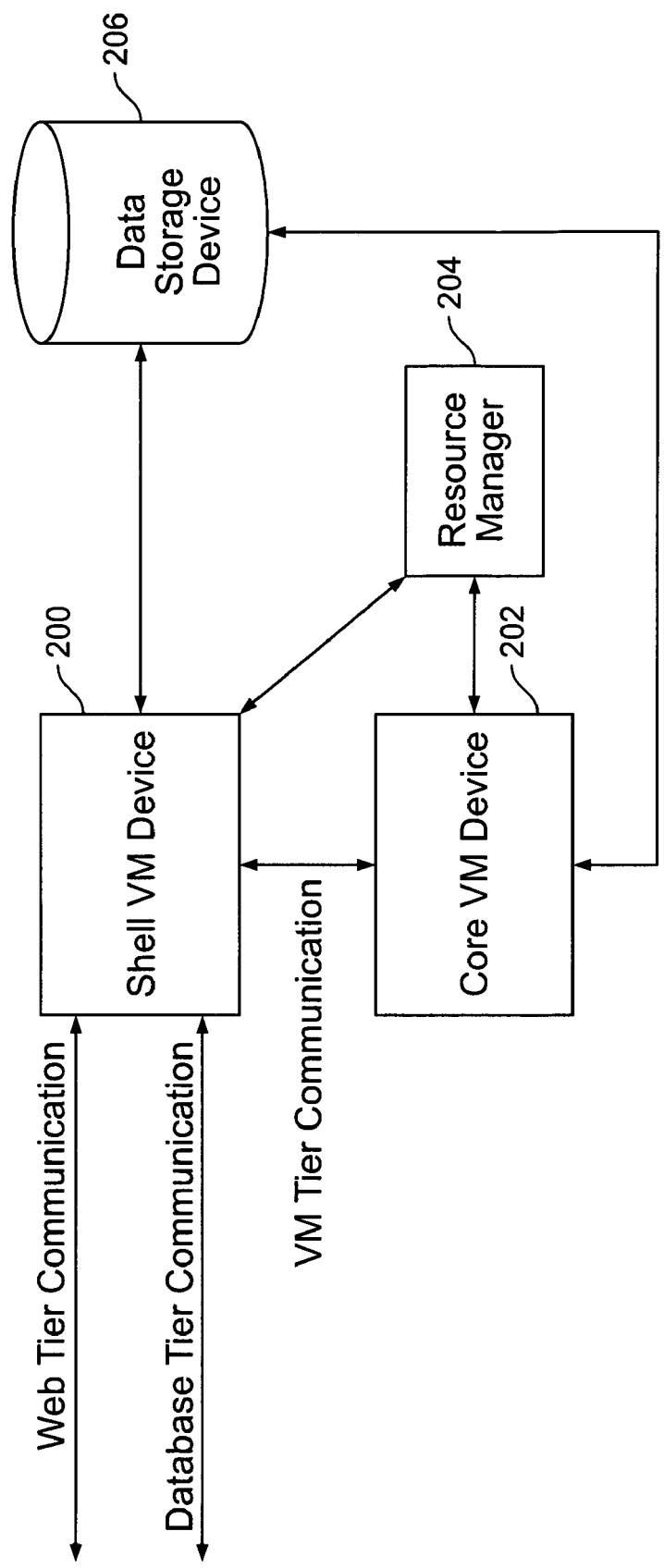
FIG. 2B is a block diagram illustrating an example system according to the present invention within a typical application server deployment.

FIG. 2B is a block diagram illustrating an example system according to the present invention within a typical application server deployment. The system includes a shell VM device 200 that includes a shell VM, a core VM device 202 that includes the core VM, a resource manager 204 and a data storage device 206. In this example, the shell VM communicates with a web tier application and a database tier application that are both external to the shell VM device. It also communicates with core VM on the core VM device, a data storage device and a resource manager.

Figure 2C:
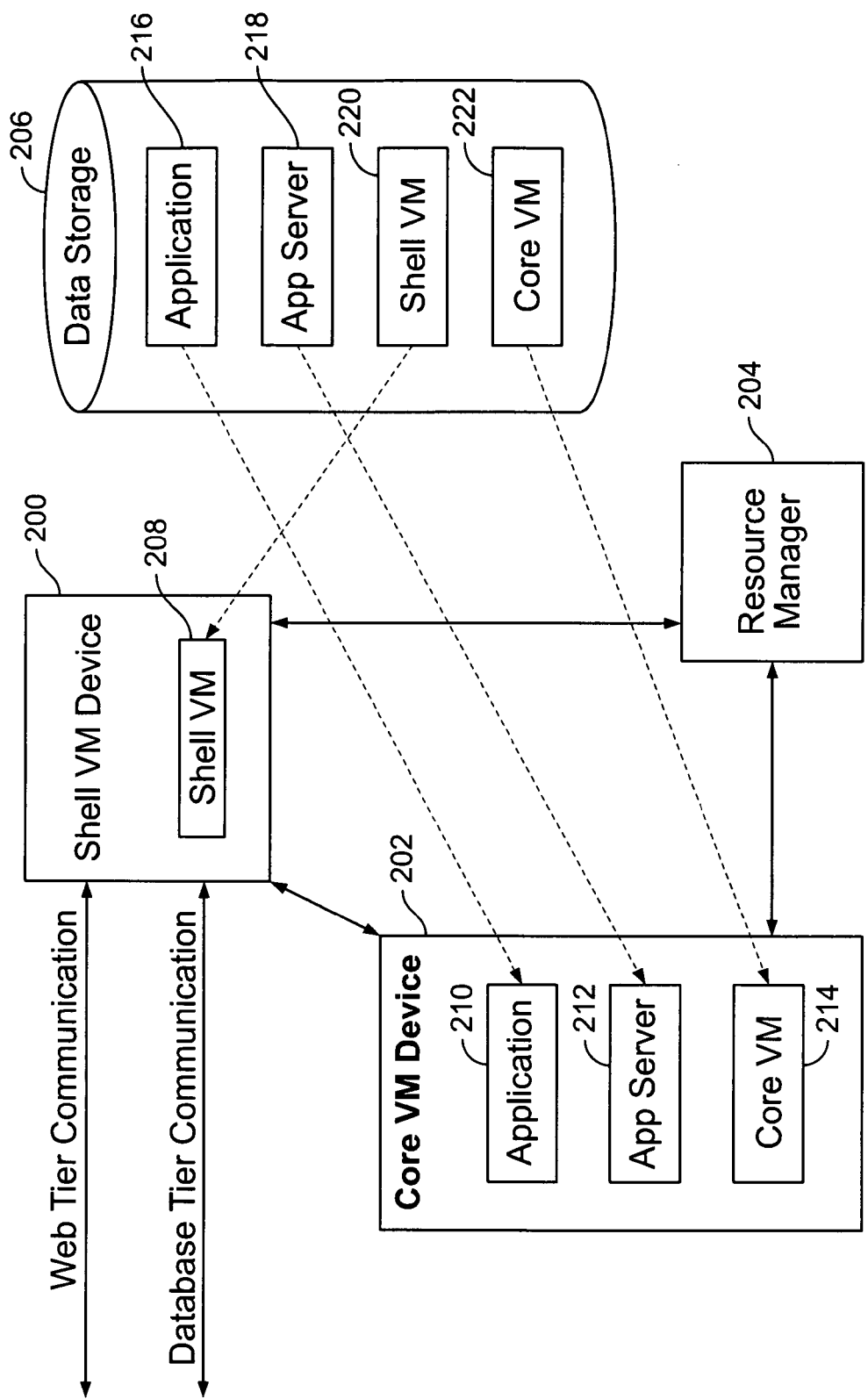
FIG. 2C is a more detailed block diagram of the example system shown in FIG. 2B.

FIG. 2C is a more detailed block diagram of the example system shown in FIG. 2B. Data storage device 206 stores various software components including application 216, application server 218, shell VM 220 and core VM 222. In other embodiments, the numbers of instances for each type of software component may vary. During initialization, instead of loading software components onto the same device, the shell VM is loaded onto shell VM device 200, whereas the application, the application server and the core VM are loaded onto core VM device 202. The dashed lines indicate the loading of software components from the data storage device to the VM devices.

The shell and core VM segment the functionality of a conventional VM. The shell VM performs interactions with the external environment. For a user, a web server or a database that comes from the external environment, the interaction with the shell VM device is transparent; that is, the interaction appears to be substantially the same as the interaction with the general purpose device shown in FIG. 1. The shell VM appears to receive and respond to requests in substantially the same way as the conventional VM shown in FIG. 1. An existing system similar to the one shown in FIG. 1 can be transparently switched to using a new configuration similar to FIGS. 2A and 2B without modifying the code for the application server and the application.

The external environment—such as a web server or a user—interacts with the system by sending requests to the shell VM device. There are many ways to conduct the interaction, including through system calls, networking calls, file input/output (I/O) calls, etc. For embodiments that employ Java VM, the interaction also includes using Java Native Interface (JNI) calls.

Calls into the VM are intercepted by shell VM 208 and forwarded to core VM 214 on core VM device 202. The calls are forwarded to the core VM using a predefined communication scheme. In one embodiment, the forwarding is performed via remote procedure calls (RPC's). The calls are received and processed by core VM 214, and then further processed by application server 212 and application 210. The processed result is sent to the shell VM, and eventually passed back to the caller. The core VM supports VM internal execution functionality such as maintaining memory and performing data processing in a way similar to a conventional VM.

Calls originating from the VM or the application executing within it are intercepted by core VM 214 and forwarded to shell VM 208 on shell VM device 200.

The calls are forwarded to the shell VM using a predefined communication scheme. In one embodiment, the forwarding is performed via RPC's. The calls are received and processed by shell VM 208 which translates them into the proper interactions with the external environment. The processed result is sent to the core VM, and eventually passed back to the caller. The shell VM supports interactions with the external environment such as system calls, file I/O, networking in a way similar to a conventional VM.

Segmenting functionality between a shell VM and a core VM improves the system's scalability, manageability, flexibility and efficiency. Since a shell VM is relatively lightweight and consumes fewer resources than a conventional VM, many instances of the shell VM can run on the same shell VM device. Similarly, many instances of core VM's, application servers and applications can run on the same core VM device. Since the shell VM's and the core VM's communicate via a network, there does not need to be a strict physical correspondence between the devices. A core VM device can concurrently host multiple core VM's and support multiple applications invoked by shell VM's from heterogeneous shell VM devices having different operating systems. Similarly, a shell VM device can concurrently support multiple shell VM's invoking applications on heterogeneous core VM devices.

Figure 1:
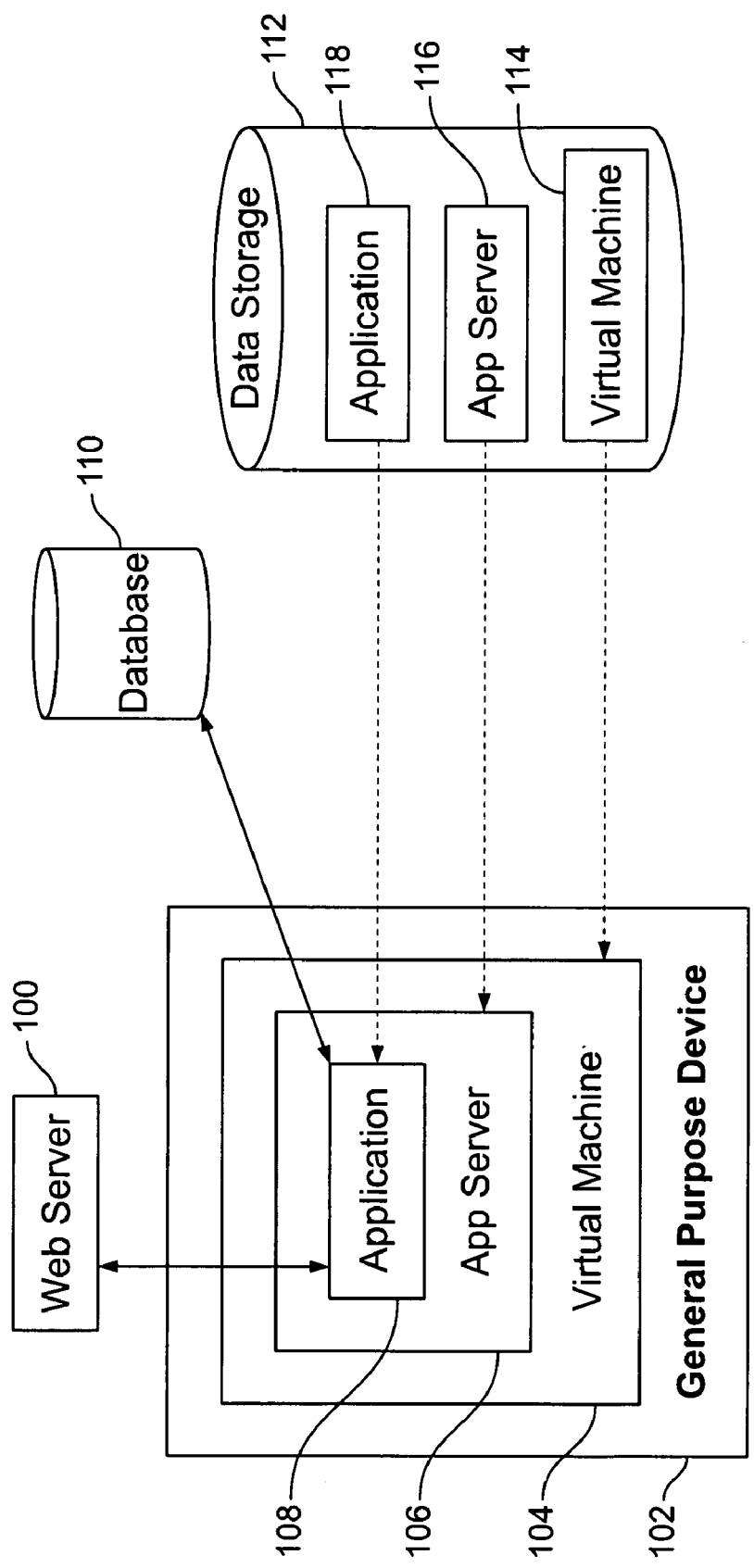
FIG. 1 is a block diagram illustrating an example system configuration for running web applications using J2EE application server frameworks.

In some embodiments, the core VM device includes specialized hardware designed to improve the performance of the core VM functionality. Many instances of core VM's executing application servers and applications can simultaneously reside on the same core VM device. The core VM device can concurrently support multiple applications invoked from heterogeneous shell VM devices. In one embodiment, a multiprocessor device with specialized hardware assists the core VM functionality. The device has the capacity to concurrently support many instances of the core VM software, executing applications and application servers, simplifying administration and increasing efficiency compared to a multitude of general purpose systems as shown in FIG. 1.

In the following discussion, flowcharts are used to illustrate various processes that take place for several embodiments of the system. It should be noted that application behavior and interactions with external environment depend on the individual application implementation and may vary for other embodiments.

Figure 3:
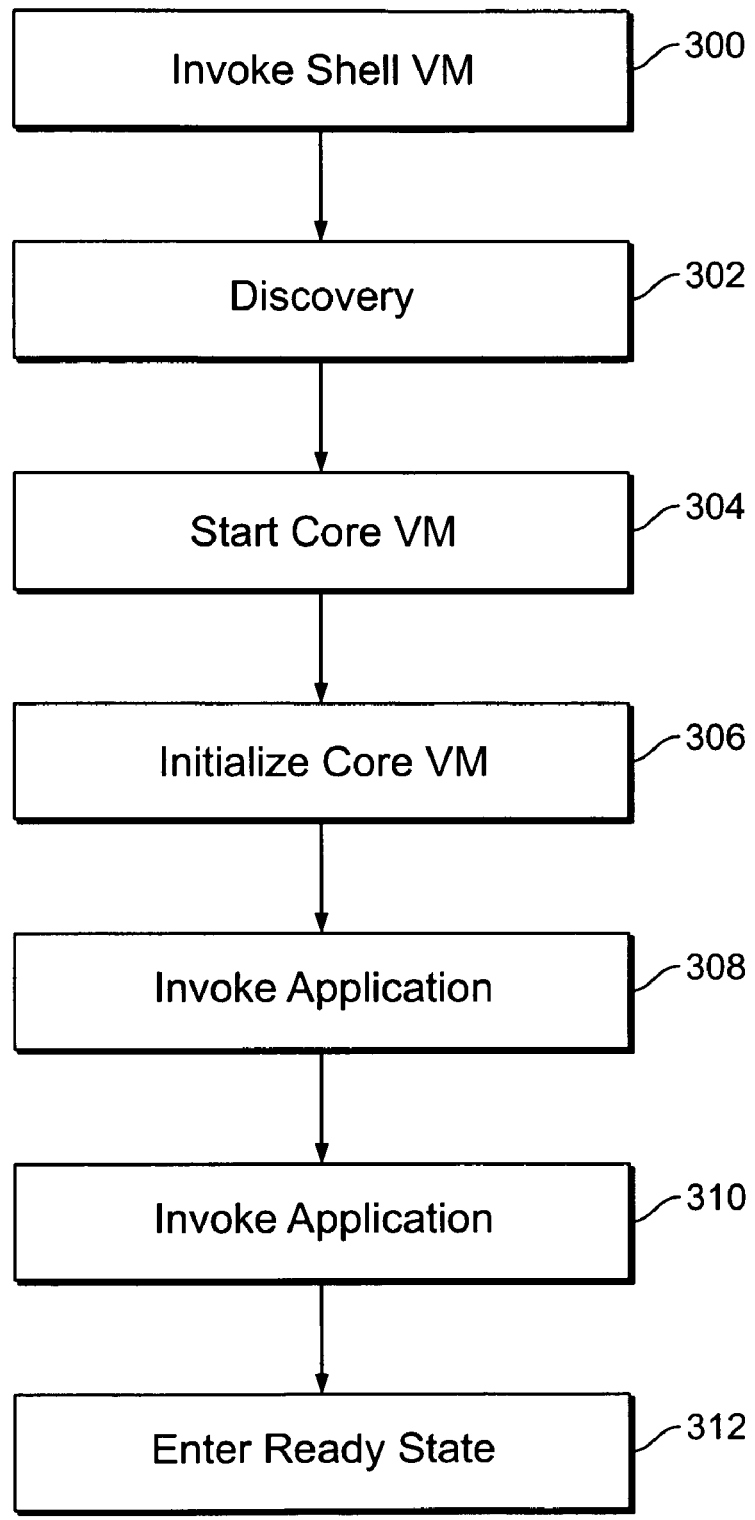
FIG. 3 is a flowchart illustrating the process of invoking an application according to one embodiment of the present invention.

FIG. 3 is a flowchart illustrating the process of invoking an application according to one embodiment of the present invention. For the purposes of this example, a shell VM and a core VM that support Java are used. It should be noted that other appropriate programming languages are supported in other embodiments. First, the shell VM is invoked on the shell VM device (300). Various methods of invoking the shell VM are supported in different embodiments, including via a command from a command line interface, an application with a graphical user interface, or a script.

In this embodiment, the shell VM is invoked by using the following command: /bin/java [VM configuration parameters] AppServerMain [application configuration parameters]. In this command, /bin/java is the execution path of the java program and points to the location of the shell VM on the data storage device. [VM configuration parameters] are optional configuration parameters that control the VM behavior. AppServerMain is the name of the main class used to start the application, and [application configuration parameters] include various configuration parameters used in the application.

Discovery of the core VM device (302) follows the invocation of the shell VM. The shell VM locates the core VM device in this step. In some embodiments, a resource manager that maintains policy information about available resources communicates with the shell VM and helps the shell VM locate a suitable core VM device. In other embodiments, the location of the core VM device could be specified in the [VM configuration parameters].

The core VM software is then started on the core VM device (304). The shell VM may deliver the core VM software from the data storage device to the core VM device, which then launches the core VM. The shell VM and the core VM establish a connection to communicate requests, responses, etc., based on a pre-defined format. In some embodiments, the core VM software is cached on the core VM device, and thus does not need to be delivered from the data storage device.

The core VM is then initialized (306). The classes needed by the core VM, including the main class and the libraries, are loaded into the core VM via file I/O operations. In this embodiment, the shell VM handles the file I/O operations and delivers the classes to be loaded by the core VM. In some embodiments, some classes may be cached on the core VM device.

The appropriate application is then invoked (308). The code for the main class of the application is loaded and executed by the core VM. The core VM loads this class and performs operations according to the program instructions.

The application is then initialized (310). The main class calls, loads, and invokes other application classes according to the instructions of the application. In this embodiment, the shell VM may need to be used to fetch the various classes by performing file I/O interactions with external devices. The application then establishes connections to various external entities including databases, name servers, and web servers. These connections are indirect connections via the shell VM. In some embodiments, some of these connections from the core VM to external entities may be direct and bypass the shell VM. In some embodiments, the application also connects to backend systems such as Siebel and SAP. The application may communicate with the backend systems via the shell VM, using networking or JNI calls.

In a typical server application, once the application is initialized it enters a ready state (312). At this point, the external applications (also referred to as clients) can make connections to the application to send requests to and receive responses from the application. Applications may open service sockets and wait for data to arrive on these sockets. The shell VM opens such service sockets for the application and relays the incoming requests to the application via the core VM.

Figure 4:
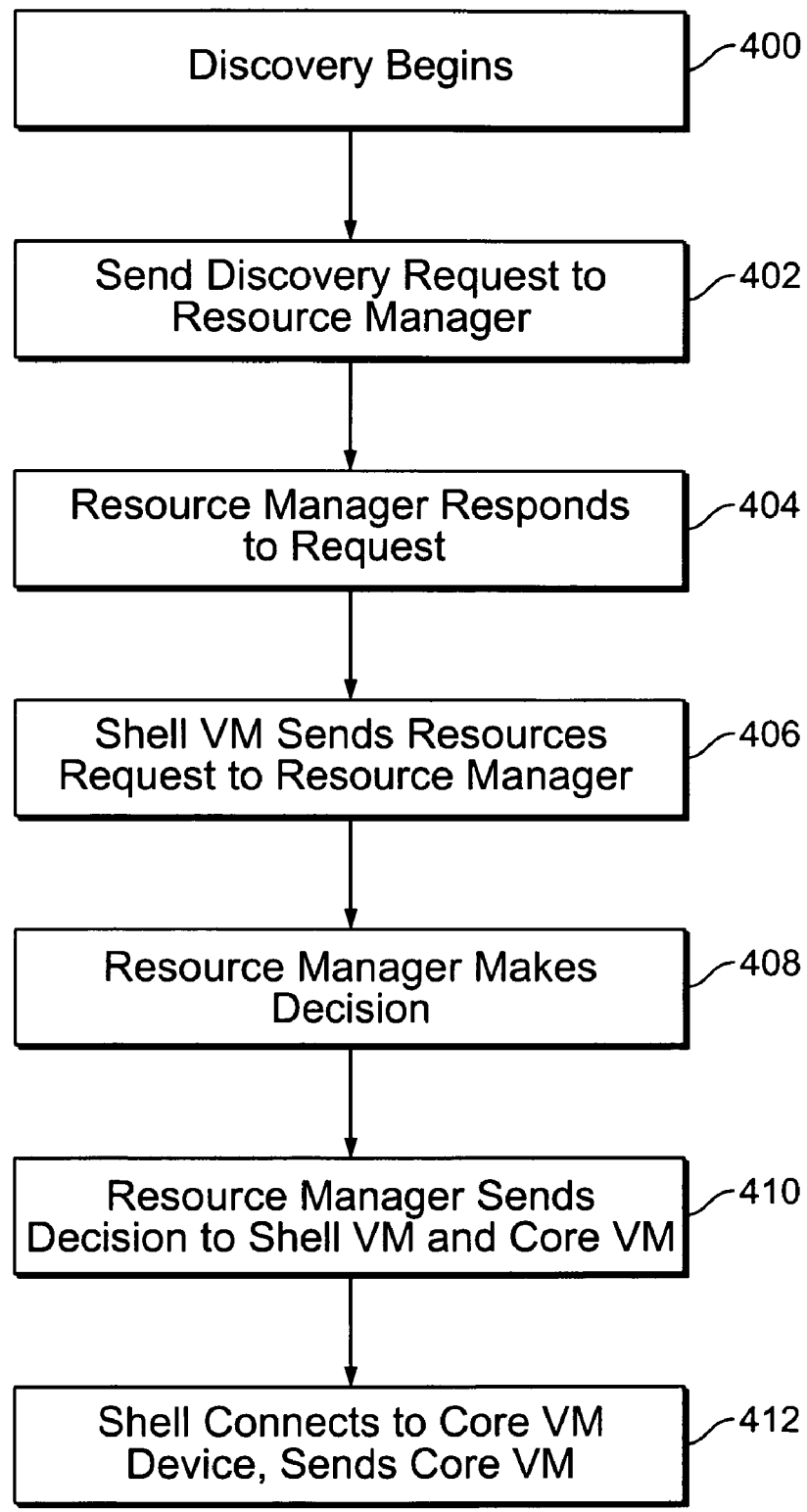
FIG. 4 is a flowchart illustrating the details of the discovery process (302) shown in FIG. 3.

FIG. 4 is a flowchart illustrating the details of the discovery process (302) shown in FIG. 3. Sometimes there is a plurality of core VM devices available in the network. The discovery process is used to locate an appropriate core VM device and assign an application and its core VM resource to it. The shell VM begins the discovery process (400). It sends a discovery request to a resource manager (402). In some embodiments, the request is sent using broadcast or multicast protocols. Multiple resource managers may exist in the network. Resource managers may reside on a general purpose device or on the core VM devices.

Resource managers respond to the request (404) by announcing their presence. The shell VM selects a resource manager out of the replying set, establishes communication with the resource manager and sends the resource manager a resource request (406). The resource request includes information about VM invocation, such as the parameters, the commands, the device and user names, etc.

The resource manager selects a core VM device to use (408) for this particular shell VM instance and determines the resource control parameters that would govern the resources available to the associated core VM on the core VM device. Generally, the resource manager maintains system configuration and resource allocation information for all the core VM devices as well as information regarding application resource usage policies. The resource manager makes policy decisions based on the information it maintains. The decision may be based on a variety of factors, including the resource request, the system configuration and the current state of the system. The resource manager sends the decision to the shell VM and in some cases the core VM device (410). The shell VM then connects to the core VM device based on the decision, and sends the core VM device the core VM software (412).

Figure 5:
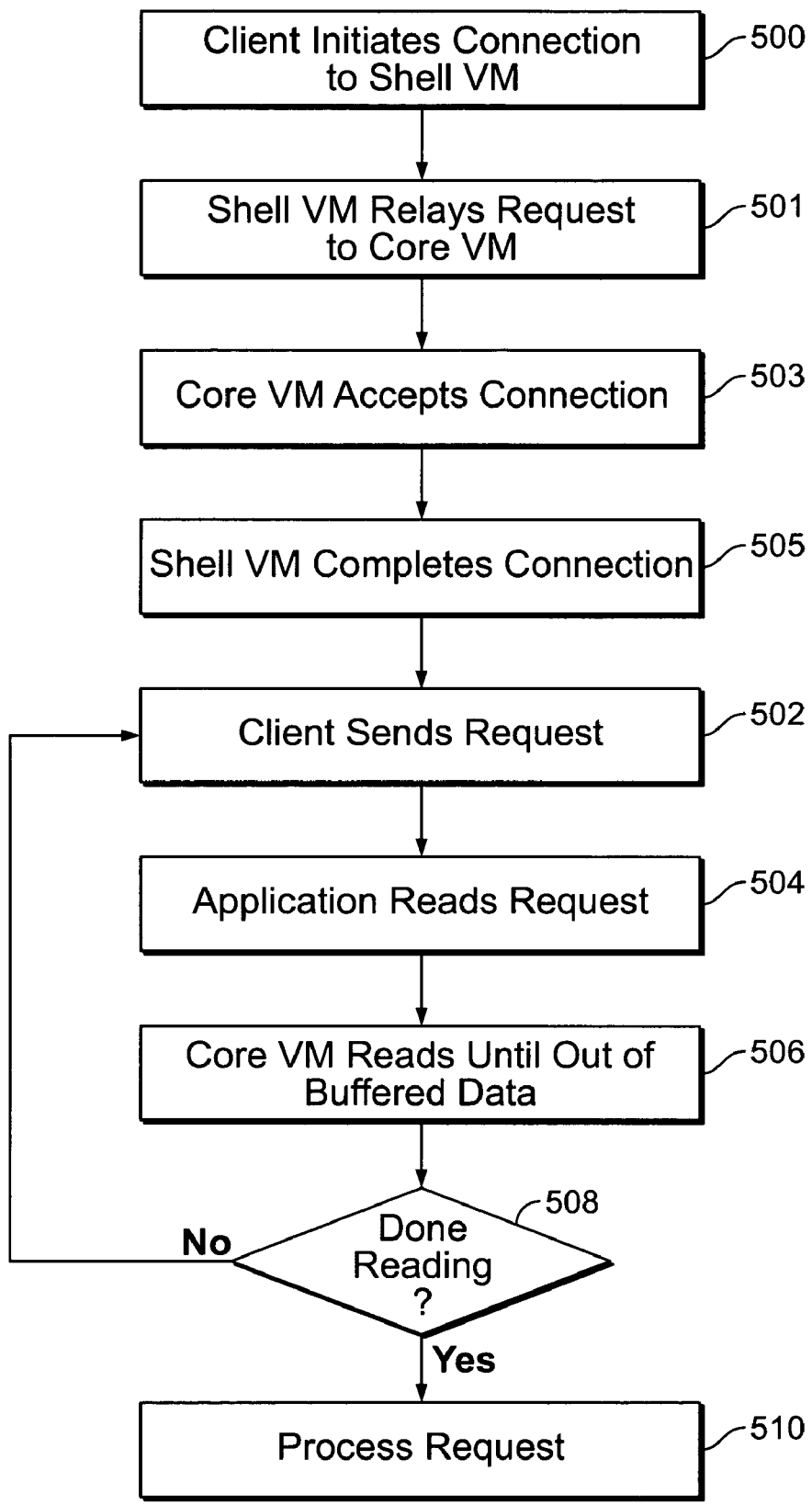
FIG. 5 is a flowchart illustrating the processing of a client initiated request in a server application, according to one embodiment of the present invention.

FIG. 5 is a flowchart illustrating the processing of a client initiated request in a server application, according to one embodiment of the present invention. A "get" request from the client is used for the purposes of this example. When a client is ready to make a request, it connects to the shell VM and opens a socket (500). The shell VM relays the client request to the core VM (501). When the core VM accepts the connection (503), it uses the shell VM to complete the connection to the client (505).

The client then sends a packet that includes information about the "get" request (502). In one embodiment, the shell VM relays the whole packet to the core VM. The core VM buffers the packet, and notifies the application that data is available. Within the core VM, the application reads bytes from a core VM buffer (504). It continues to read more bytes until there is no more data in the buffer (506). It is then determined whether the application has finished reading the request (508). If it has not, control is transferred to step 502 and more data is sent and buffered. If the application has finished reading the request, it will go on to process the request (510).

Figure 6:
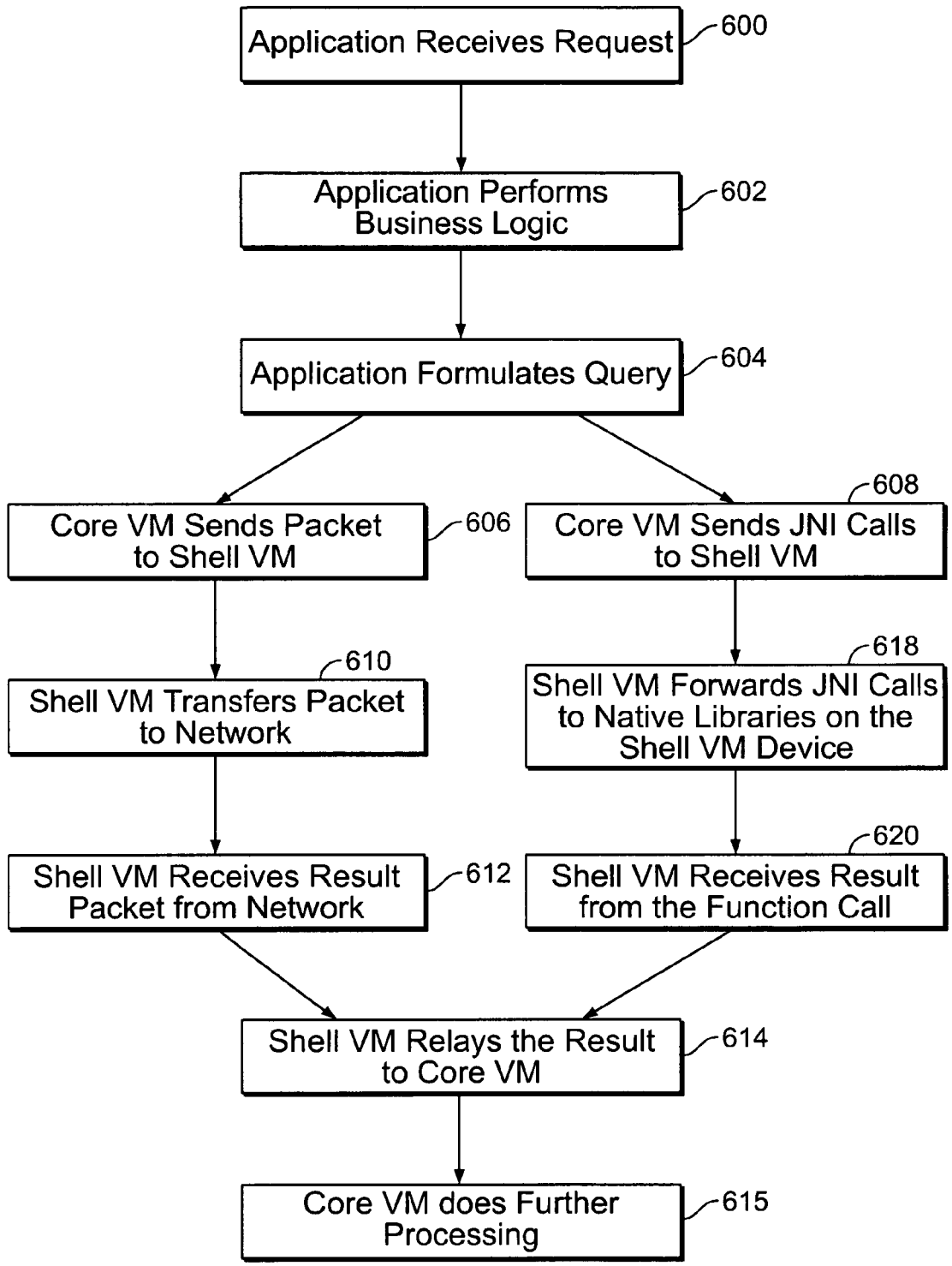
FIG. 6 is a flowchart illustrating an example callback from the core VM to the shell VM in response to a client request, according to one embodiment of the present invention.

FIG. 6 is a flowchart illustrating an example callback from the core VM to the shell VM in response to a client request, according to one embodiment of the present invention. A client request that causes a database query is used for the purposes of this example. An application running inside the core VM gets a request from a client (600), and the business logic operations associated with the request are carried out subsequently (602). A query is formulated based on business logic requirements (604), and then sent to the shell VM either as a set of networking packets (606) or as one or more JNI calls (608).

If a query is sent as packets to the shell VM (606), then the shell VM transfers these packets to the network (610). The database that is queried then sends back the results, which are encapsulated in packets according to a pre-defined scheme. The shell VM receives the result packets from the network (612), and then relays the result to the core VM (614) to complete any further processing (615).

Upon receiving a JNI call from the application, the core VM forwards the call to the shell VM (608). The shell VM then forwards the JNI calls to native libraries on the shell VM device, which perform operations according to the JNI calls (618). The shell VM receives the result from the function call to the native libraries (620). The shell VM then relays the result to the core VM (614) to complete any further processing (615).

Figure 7:
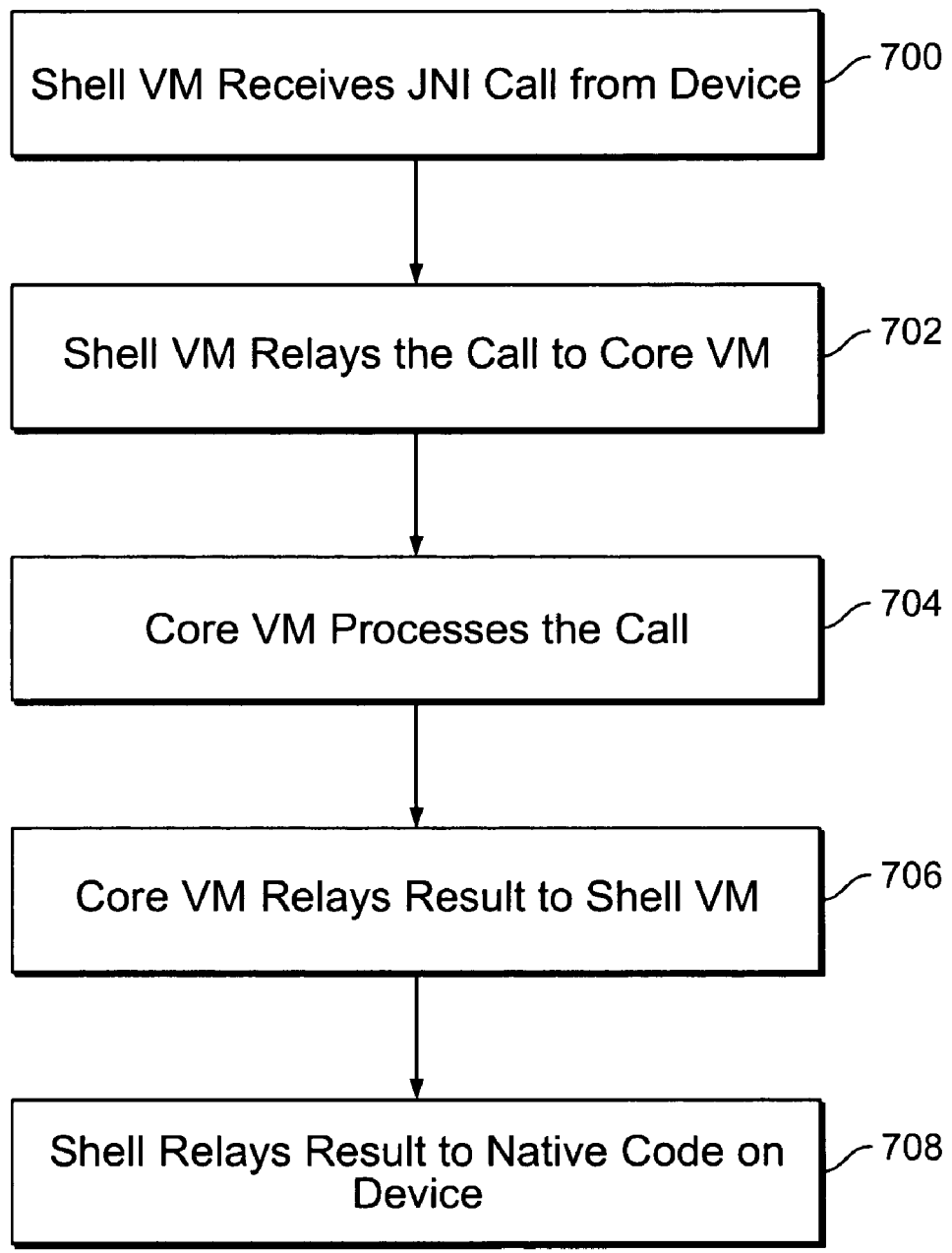
FIG. 7 is a flowchart illustrating an example callback from native code running on the shell VM device to the application running on the core VM.

FIG. 7 is a flowchart illustrating an example callback from native code running on the shell VM device to the application running on the core VM. The shell VM receives a JNI callback made by native code on the shell VM device (700). It relays the call to the core VM (702). The core VM processes the call and performs any business logic necessary to produce the desired result (704). The core VM sends the result back to the shell VM (706), and the shell VM relays the result back to the native code on the shell VM device (708).

Figure 8A:
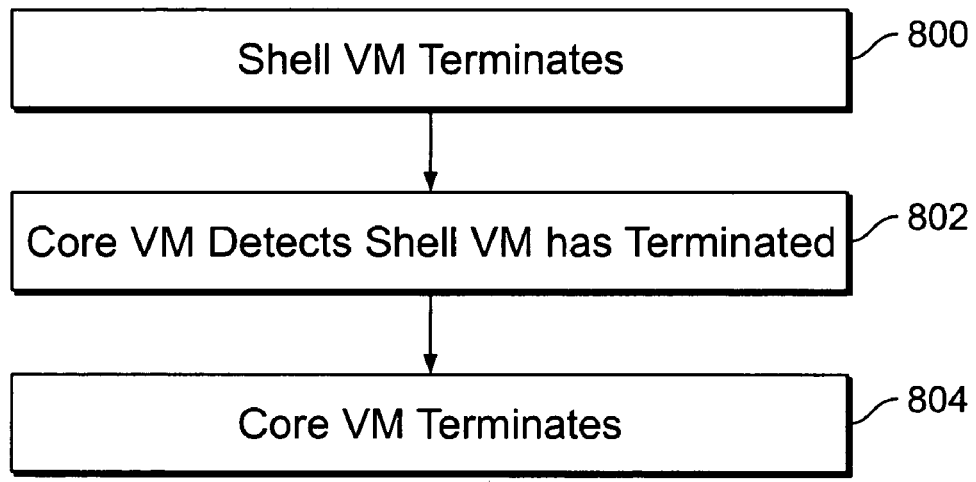
FIG. 8A is a flowchart illustrating an abrupt termination process according to one embodiment of the present invention

In some embodiments, the shell VM terminates after some operations are completed. The core VM is terminated as well. The system is designed to handle both abrupt termination (shell VM terminates abruptly without notifying the core VM) and planned termination (shell VM terminates and gives the core VM notification). FIG. 8A is a flowchart illustrating an abrupt termination process according to one embodiment of the present invention. First, the shell VM termninates (800). The core VM continuously monitors the shell VM's activities by using a heartbeat. Once the heartbeat ceases, the core VM detects that the shell VM has shut down (802), the core VM then terminates (804).

Figure 8B:
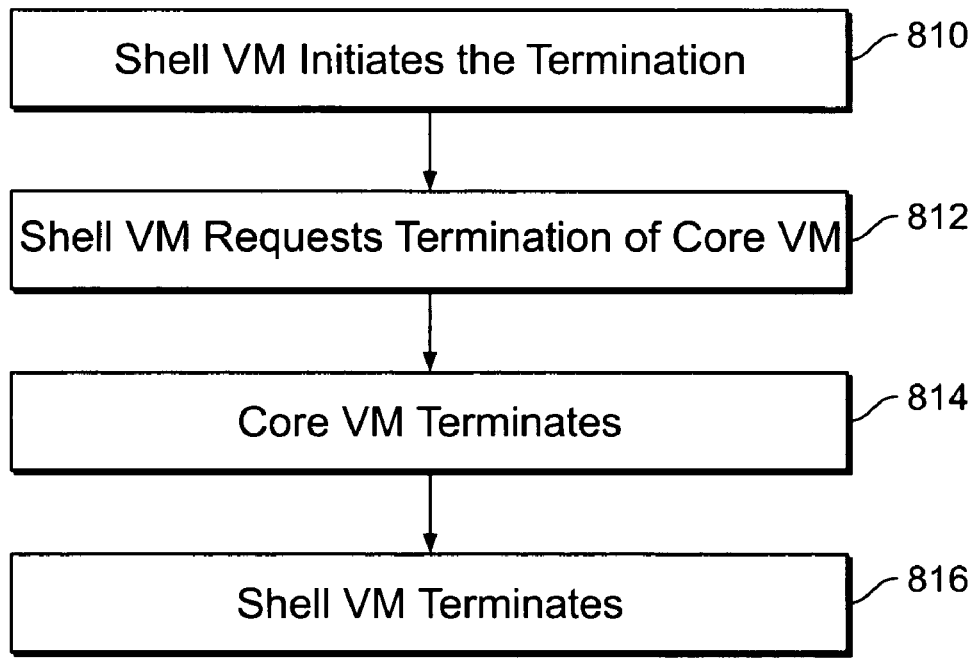
FIG. 8B is a flowchart illustrating a planned termination process according to one embodiment of the present invention

FIG. 8B is a flowchart illustrating a planned termination process according to one embodiment of the present invention. First, the shell VM initiates its termination (810). It sends a message to the core VM requesting the core VM to be terninated (812). Upon receiving the request, the core VM terminates (814). Finally the shell VM finishes its own termination (816).

An improved virtual machine (VM) system and its associated methods have been disclosed. A shell VM and a core VM are used to segment the overall functionality of a conventional VM. The segmented design improves scalability and efficiency, simplifies admninistration, and transparently integrates with existing systems.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of providing a segmented virtual machine (VM) comprising:
   providing a core VM residing on a core VM device; and
   providing a shell VM residing on a shell VM device that is separate from the core VM device, the shell VM being associated with the core VM; wherein:
   the core VM is configured to perform VM internal execution functions and is configured to indirectly interact with an external environment via the shell VM;
   the shell VM is configured to communicate with the core VM and is configured to perform shell VM functions that are different from the VM internal execution functions performed by the core VM, the shell VM functions including direct interactions with the external environment; and
   the shell VM and the core VM reside on separate devices while cooperating to function as a single virtual machine.

2. The method as recited in claim 1 wherein the VM internal execution functions include managing memory.

3. The method as recited in claim 1 wherein the VM internal execution functions include performing computations.

4. The method as recited in claim 1 wherein the VM internal execution functions include processing logic.

5. The method as recited in claim 1 wherein the VM internal execution functions include processing data.

6. The method as recited in claim 1 wherein the VM internal execution functions include transferring data.

7. The method as recited in claim 1 wherein the shell VM acts as a relay between the core VM and an external environment.

8. The method as recited in claim 1 wherein the shell VM is further configured to perform interactions with an external environment; and the interactions with the external environment include Java Native Interface calls.

9. The method as recited in claim 1 wherein the direct interactions with the external environment include system calls.

10. The method as recited in claim 1 wherein the direct interactions with the external environment include networking calls.

11. The method as recited in claim 1 wherein the direct interactions with the external environment include file input/output calls.

12. The method as recited in claim 1 wherein distribution of VM internal execution functions and shell functions is transparent to an external application.

13. The method as recited in claim 1 further comprising a resource manager configured to manage system resources.

14. The method as recited in claim 1 further comprising a resource manager configured to maintain policy information.

15. The method as recited in claim 1 further comprising a resource manager where the resource manager determines a location of the core VM device to execute the core VM.

16. The method as recited in claim 1 further comprising a resource manager where the resource manager determines resource control parameters that govern resources available to the core VM.

17. The method as recited in claim 1 wherein the shell VM and the core VM monitor each other's state via a heartbeat signal.

18. The method as recited in claim 1 wherein the core VM and the shell VM communicate via remote procedure calls (RPC's).

19. A core virtual machine (VM) device comprising:
a core VM processor that includes a core VM configured to perform VM internal execution functions; and
a communication interface coupled to the processor; wherein:
the core VM is configured to indirectly interact with an external environment via a shell VM residing on a separate shell VM device and being configured to perform shell VM functions that are different from the VM internal execution functions performed by the core VM, and the core VM is further configured to provide VM internal execution results relayed by the shell VM; and
the shell VM and the core VM reside on separate devices while cooperating to function as a single virtual machine.

20. A core VM device as recited in claim 19 wherein the core VM device is further configured to concurrently host a plurality of core VM's.

21. A core VM device as recited in claim 19 wherein the core VM device is further configured to concurrently host a plurality of core VM's and concurrently support a plurality of shell VM's.

22. A core VM device as recited in claim 19 wherein the core VM device is further configured to concurrently host a plurality of core VM's and concurrently support a plurality of shell VM's on heterogeneous shell VM devices.

23. A core VM device as recited in claim 19 wherein the core VM device is further configured to concurrently host a plurality of core VM's and concurrently support a plurality of shell VM's on a plurality of shell VM devices.

24. A shell virtual machine (VM) device comprising:
a shell VM processor that includes a shell VM configured to provide a relay interface to an external environment; and
a communication interface coupled to the processor; wherein:
the shell VM is configured to perform shell VM functions including to directly interact with the external environment, and is configured to communicate via the communication interface with a core VM residing on a core VM device external to the shell VM device to relay interactions with the external environment;
the core VM is configured to perform VM internal execution functions that are different from the shell VM functions; and
the shell VM device and the core VM reside on separate devices while cooperating to function as a single virtual machine.

25. A method for executing a web application comprising:
initializing a shell virtual machine (VM) residing on a shell VM device;
initializing a core VM residing on a core VM device that is separate from the shell VM device;
establishing communication between the shell VM and the core VM;
initializing the web application; wherein:
the core VM is configured to perform VM internal execution functions including maintaining memory and processing data and is configured to indirectly interact with an external environment via the shell VM;
the shell VM is configured to communicate with the core VM and perform shell VM functions that are different from the VM internal execution functions, the shell VM functions including direct interactions with an external environment; and
the shell VM and the core VM reside on separate devices while cooperating to function as a single virtual machine.

* * * * *